US011941636B2

(12) United States Patent
Cuan et al.

(10) Patent No.: US 11,941,636 B2
(45) Date of Patent: Mar. 26, 2024

(54) BROWSER PROVISIONED VIRTUAL PAYMENT CARD FOR AN AUTHORIZED USER

(71) Applicant: Capital One Services, LLC, McLean, VA (US)

(72) Inventors: Lukiih Cuan, Washington, DC (US); Michael Wolf, Ellicott City, MD (US); Abhay Donthi, Arlington, VA (US); Phoebe Atkins, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/863,872

(22) Filed: Jul. 13, 2022

(65) Prior Publication Data

US 2024/0020699 A1   Jan. 18, 2024

(51) Int. Cl.
*G06Q 40/08* (2012.01)
*G06Q 20/34* (2012.01)
*G06Q 20/40* (2012.01)
*G06Q 40/03* (2023.01)

(52) U.S. Cl.
CPC ....... *G06Q 20/4016* (2013.01); *G06Q 20/351* (2013.01); *G06Q 40/03* (2023.01)

(58) Field of Classification Search
CPC .......... G06Q 20/4016; G06Q 20/351
USPC ........................................... 705/44
See application file for complete search history.

(56) References Cited

U.S. PATENT DOCUMENTS

| 11,044,279 | B1 | 6/2021 | Benkreira et al. |
| 2009/0006254 | A1 | 1/2009 | Mumm et al. |
| 2012/0191517 | A1 | 7/2012 | Daffin et al. |
| 2014/0074726 | A1 | 3/2014 | Lee et al. |
| 2015/0262161 | A1 | 9/2015 | McMullan et al. |
| 2015/0363754 | A1 | 12/2015 | Hosp et al. |
| 2016/0071105 | A1 | 3/2016 | Groarke et al. |
| 2017/0109802 | A1 | 4/2017 | Kothari et al. |
| 2018/0082295 | A1 | 3/2018 | Boucard |

(Continued)

OTHER PUBLICATIONS

MasterCard International Submits United States Patent Application for Method and System for Risk Based Decisioning for One Click Checkout Global IP News. Business and Commerce Patent News [New Delhi] Feb. 1, 2018. (Year: 2018).*

*Primary Examiner* — William E Rankins
(74) *Attorney, Agent, or Firm* — Bookoff McAndrews, PLLC (57) ABSTRACT

Disclosed embodiments pertain to provisioning a virtual payment card for an authorized user in a browser. A primary cardholder can request the addition of an individual as an authorized user on the primary cardholder's account. Further information regarding the individual can be solicited and utilized to compute a risk score associated with adding the individual as an authorized user. Further processing of the request, including whether to terminate or continue, can be based on comparing the risk score to a predetermined threshold. If processing is continued, a virtual payment card linked to the primary cardholder account is generated. Next, the virtual card can be added as a payment method to a browser profile of the individual on a network-accessible computing resource. Subsequently, the authorized user can access the virtual card to make online shopping payments with a web browser personalized with the browser profile.

17 Claims, 7 Drawing Sheets

(56) References Cited

U.S. PATENT DOCUMENTS

| | | |
|---|---|---|
| 2019/0050849 A1 | 2/2019 | Yoo |
| 2021/0073826 A1 | 3/2021 | Garrett et al. |

\* cited by examiner

BROWSER PROVISIONED VIRTUAL PAYMENT CARD FOR AN AUTHORIZED USER

BACKGROUND

A payment card, such as a debit or credit card, provides a mechanism to pay a merchant for goods and services electronically. Payment card information, such as name, number, expiration date, and security code, can be provided through a payment terminal, online, or over the phone to complete a purchase. A payment card typically includes a magnetic strip that encodes the payment information in a manner that a payment terminal can read. Further, some payment cards include an embedded microchip that aids in fraud prevention by creating a unique code for each sales transaction. Further yet, contactless payment is enabled by embedding a radio-frequency identification (RFID) or near field communication (NFC) chip into the payment card or using a smartphone with a mobile wallet that includes the payment card information.

Two cardholders can utilize a payment account: primary cardholders and authorized users. A primary cardholder refers to the main user of a payment card account. The primary cardholder is responsible for maintenance of the account as well as the debt and balance of the account. A primary cardholder can add an authorized user by calling a card issuer or logging in to an online account. Subsequently, a second physical card can be issued and mailed to the primary cardholder to give to the authorized user, or the second physical card can be sent directly to the authorized user. The authorized user can then utilize the payment card to make purchases.

SUMMARY

The following presents a simplified summary to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description presented later.

Briefly described, disclosed aspects pertain to a browser provisioned virtual payment card for an authorized user. A primary cardholder on an account can request that a financial institution add an individual as an authorized user. In response to the request, information regarding the individual can be solicited from the primary cardholder, including a browser account or profile identifier. Subsequently, browser information can be requested and received from a browser profile based on the identifier. The information can be analyzed, and a risk score computed that quantifies the risk involved with adding the individual as an authorized user. Further processing can be controlled based on a comparison of the risk score to a predetermined threshold. The process can be terminated if the risk is unacceptable. Alternatively, card purchase restrictions can be recommended to mitigate the risk. A virtual payment card can be generated if the risk is deemed acceptable. The virtual payment card can be linked to the primary cardholder's account and constrained by any purchase restrictions specified by the primary cardholder. Subsequently, the virtual payment card can be provided or otherwise made available for addition to a browser account or profile as a payment method. The authorized user can facilitate the addition of the virtual payment card and later utilize the virtual payment card to make an online purchase through a web browser with the virtual payment card.

According to one aspect, disclosed embodiments can include a system that comprises a processor coupled to a memory that includes instructions that, when executed by the processor, cause the processor to request information about an individual, including a browser profile identifier, in response to a request from a primary cardholder to add the individual as an authorized user, compute a risk score associated with adding the individual as an authorized user based on the information, control further processing based on a result of a comparison between the risk score and a predetermined threshold, generate a virtual payment card linked to an account of a primary cardholder that enables an online purchase with the virtual payment card, and initiate the addition of the virtual payment card as a payment method to a browser profile of the individual on a network-accessible computing resource based on the browser profile identifier. The system can also include instructions that cause the processor to notify the primary cardholder of the risk score when the risk score satisfies the predetermined threshold, request permission to proceed from the primary cardholder, and initiate the further processing in generation of the virtual payment card and addition of the virtual payment card as the payment method to the browser profile when the permission is granted. The instructions can further cause the processor to terminate processing and transmit a message to the primary cardholder that indicates the request is rejected based on the result of the comparison. The instructions can further cause the processor to compute the risk score based on information associated with a browser profile or account, such as at least one of browser version, internet protocol address, devices used, or browser history. Further, the instructions cause the processor to generate and transmit a recommendation to apply one or more purchase restrictions on the virtual payment card based on the risk score. The instructions can also cause the processor to initiate the removal of the virtual payment card as the payment method. In one instance, the instructions can cause the processor to initiate the removal in response to cancelation of the virtual payment card by the primary cardholder. Furthermore, addition of the virtual card comprises instructions that cause the processor to request the individual login to a network-accessible resource to access the browser profile, solicit permission to add the virtual payment card, and trigger execution of a program that automatically adds the virtual payment card as a payment method to the browser profile in response to granted permission. In one instance, the browser profile is utilized by a client-side browser for personalization after the individual logs in through the browser.

According to another aspect, disclosed embodiments can include a computer-implemented method comprising executing, on a processor, instructions that cause the processor to perform operations that provision a virtual payment card to a web browser. The operations comprise requesting information about an individual from a primary cardholder in response to a request to add an individual as an authorized user to an account of the primary cardholder, computing a risk score based on provided information, determining that the risk score satisfies a predetermined threshold for further processing, generating a virtual payment card linked to an account of the primary cardholder, wherein the virtual payment card is an electronic payment mechanism for online shopping purchases, and initiating addition of the virtual payment card as a payment method to a browser profile of the individual, wherein the browser profile is stored on a network-accessible computing resource and employed to personalize a web browser. The operations can further comprise requesting the individual login to access the browser profile of the individual, soliciting permission to add the virtual payment card, and executing a program in response to granted permission that automatically adds the virtual payment card as the payment method for the browser profile. The operations can further comprise computing a risk score based on browsing information associated with the browser profile. Further, the operations can comprise terminating processing prior to generating the virtual payment card and initiating addition of the virtual payment card as the payment mechanism in response to the risk score failing to satisfy the predetermined threshold. The operations can also comprise determining one or more purchase restrictions on the virtual payment card that reduce the risk score in response to the risk score satisfying the predetermined threshold and recommending specification of the purchase restrictions to the primary cardholder. The operations can also include initiating the removal of the virtual payment card in response to canceling the virtual payment card by the primary cardholder. The operations can further comprise notifying the individual of a virtual payment card restriction that causes a purchase transaction to be declined.

Per another aspect, disclosed embodiments can include a computer-implemented method of virtual card provisioning. The method comprises generating a virtual payment card in response to a request by a primary account holder to add an individual as an authorized user, wherein the virtual payment card enables online shopping, requesting contact information for the individual from the primary account holder, transmitting a message to the individual using the contact information requesting the individual provide access to a browser profile on a network-accessible computing resource, and executing a program that automatically adds the virtual payment card to the browser profile as a payment method for use with a browser. The method can further comprise computing a risk score associated with the individual based on information provided by the primary account holder and terminating execution prior to generating the virtual payment card when the risk score is satisfied. The method further comprises computing the risk score based on information associated with the browser profile, such as browser version, internet protocol address, devices used, or browser history associated with the browser profile.

To the accomplishment of the foregoing and related ends, certain illustrative aspects of the claimed subject matter are described herein in connection with the following description and the annexed drawings. These aspects indicate various ways in which the subject matter may be practiced, all of which are intended to be within the scope of the disclosed subject matter. Other advantages and novel features may become apparent from the following detailed description when considered in conjunction with the drawings.

DETAILED DESCRIPTION

Details herein pertain to a browser provisioned virtual payment card for an authorized user. In response to a request by a primary cardholder to add an individual as an authorized user, information is solicited and acquired regarding the individual. The acquired information can correspond to primary cardholder-provided data and web browser data associated with actions of the individual. The information is utilized to compute a risk score associated with the individual. The risk score can be compared to a predetermined threshold and further processing controlled based on the comparison result. For example, if the comparison result indicates that the individual is a bad actor, further processing can be terminated. If processing continues, a virtual payment card linked to an account of the primary cardholder can be generated to enable online purchases with the virtual payment card. Subsequently, addition of the virtual payment card as a payment method for a browser profile of the individual can be initiated.

Various aspects of the subject disclosure are now described in more detail with reference to the annexed drawings, wherein like numerals generally refer to like or corresponding elements throughout. It should be understood, however, that the drawings and detailed description relating thereto are not intended to limit the claimed subject matter to the particular form disclosed. Instead, the intention is to cover all modifications, equivalents, and alternatives falling within the spirit and scope of the claimed subject matter.

Figure 1:
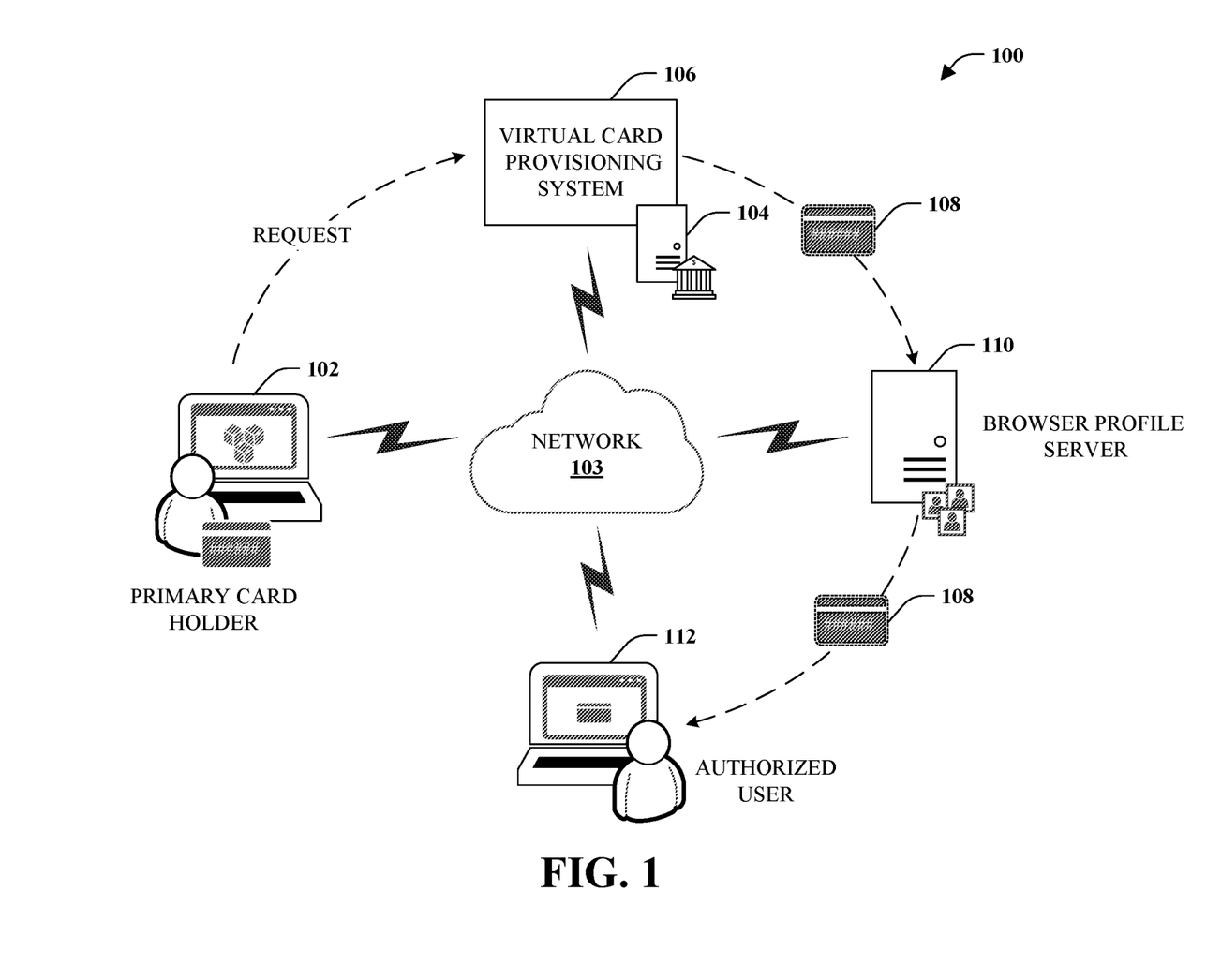
FIG. 1 illustrates an overview of an example implementation.

Referring initially to FIG. 1, a high-level overview of an example implementation 100 is depicted. The example implementation 100 includes first computing device 102 of a primary cardholder, network 103, financial institution server 104, virtual card provisioning system 106, browser profile server 110, and second computing device 112 of an individual designated as an authorized user.

The first computing device 102 can correspond to a personal computer of a primary cardholder. A primary cardholder is an individual to whom a payment card was issued for an account opened and maintained by a financial institution. For example, the payment card can be a credit card associated with a credit account or a debit card linked to a bank account, among other things. The primary cardholder is responsible for transactions made with the payment card and can make payments and manage an account electronically through an application or website of a financial institution using the first computing device 102. The first computing device can correspond to a personal computer such as a laptop computer as shown or another computing device, such as a desktop or tablet computer. The first computing device 102 is communicatively coupled to the financial institution server 104 over the network 103.

The network 103 can correspond to a wide area network (WAN) in one instance. In accordance with an embodiment, network 103 can correspond to the internet or a global system of interconnected computer networks and devices that uses the internet protocol (TCP/IP) to communicate.

The internet can support inter-linked hypertext documents and services on the web, among other things. In one instance, the network 103 can support access to banking applications or services.

As part of account management, a primary cardholder or account holder can request that a second individual be added as an authorized user to the account. For example, the primary cardholder can add their child, spouse, or friend as an authorized user. An authorized user is granted permission to use an account of the primary cardholder but is not responsible for paying the bill. The primary cardholder can send a request over the network 103 to the financial institution server 104 to initiate addition of an authorized user. The financial institution server 104 can correspond to hardware, software, or both that provide functionality or services to multiple clients in a client-server architecture. In response, the financial institution server 104 can send back some options. In addition to sending a physical payment to the primary cardholder or designated individual, one option is a browser-provisioned virtual payment card. Selection of a browser-provisioned virtual payment card triggers execution of the virtual card provisioning system 106 on the financial institution server 104.

The virtual card provisioning system 106 can request information regarding the individual to be added as an authorized user. The information can include name, address, phone number, and social security number. Additionally, the virtual card provisioning system 106 can request an identifier associated with a browser account or profile, such as an email address, that personalizes a service for web browsing and online shopping. The virtual card provisioning system 106 can utilize the identifier first to request further information about the individual from the browser profile server 110. This information can include browser version, internet protocol address, devices used, browser history, and personal information, among other things. Of course, provided information can be limited to that permitted by the individual owner of the profile.

The virtual card provisioning system can next evaluate the risk of adding the individual as an authorized user. A risk score can be computed based on information provided by the primary cardholder as well as any information received or retrieved from the browser profile server. The risk score can then be evaluated against a predetermined threshold designed to infer that the individual is a bad actor or credit risk, among other things.

Processing associated with adding an individual as an authorized user can be controlled based on comparing the risk score to a predetermined threshold. In one instance, the comparison result can indicate that the individual should not be an authorized user as the determined risk exceeds an acceptable risk. Consequently, further processing associated with adding the individual as an authorized user can be terminated and, optionally, a message sent to the primary cardholder. Alternatively, processing can add the individual as an authorized user, for example, if the risk is deemed equal or less than an acceptable risk. In one scenario, the process can proceed but be augmented by providing a recommendation to the primary cardholder regarding adding purchasing constraints to a virtual payment card to mitigate risk. For example, a constraint recommendation can be made to improve the risk score from unacceptable to acceptable. Processing can continue with the virtual card provisioning system 106, which generates or triggers generation of a virtual payment card 108. The virtual payment card 108 comprises a unique card number, expiration date, and card verification code. The virtual payment card is non-physical, unlike traditional physical credit and debit cards. In some instances, the virtual payment card 108 can be referred to as a virtual card number (VCN) due the non-physical nature and associated unique card number. Further, the virtual payment card 108 is distinct from smartphone payment applications (e.g., Apple Pay, Google Pay) in that the virtual payment card 108 is platform agnostic, or, in other words, platform-independent. Furthermore, the virtual payment card 108 is linked to an account of a primary cardholder. Still further yet, the primary cardholder can add purchase constraints or restrictions to the virtual payment card 108. For example, the payment card can be restricted to a single-use, a particular store, a particular product, or transaction amount.

After the virtual payment card 108 is generated, the virtual payment card 108 can be sent to the browser profile server 110 for addition to the browser profile of the authorized user. In one instance, an email can be sent to the authorized user informing them that a virtual card can be downloaded to the authorized user's browser profile. The second computing device 112 of the authorized user could be employed to log in to the user's account or browser profile through the network 103 and accept the virtual payment card 108 as a browser payment method. Subsequently, the authorized user can employ the virtual payment card 108 using the second computing device 112 to pay for goods and services online. Further, the virtual payment card 108 is not limited to the second computing device 112. Instead, the payment card 108 can be employed on any device that includes a browser.

The primary cardholder can connect to the financial institution server 104 using the first computing device 102 and add, remove, or change any purchase constraints associated with an issued virtual payment card. Further, the primary cardholder can cancel the virtual payment card. In one scenario, the virtual card provisioning system 106 can connect to the browser profile server and remove the virtual payment card as a payment method automatically.

Figure 2:
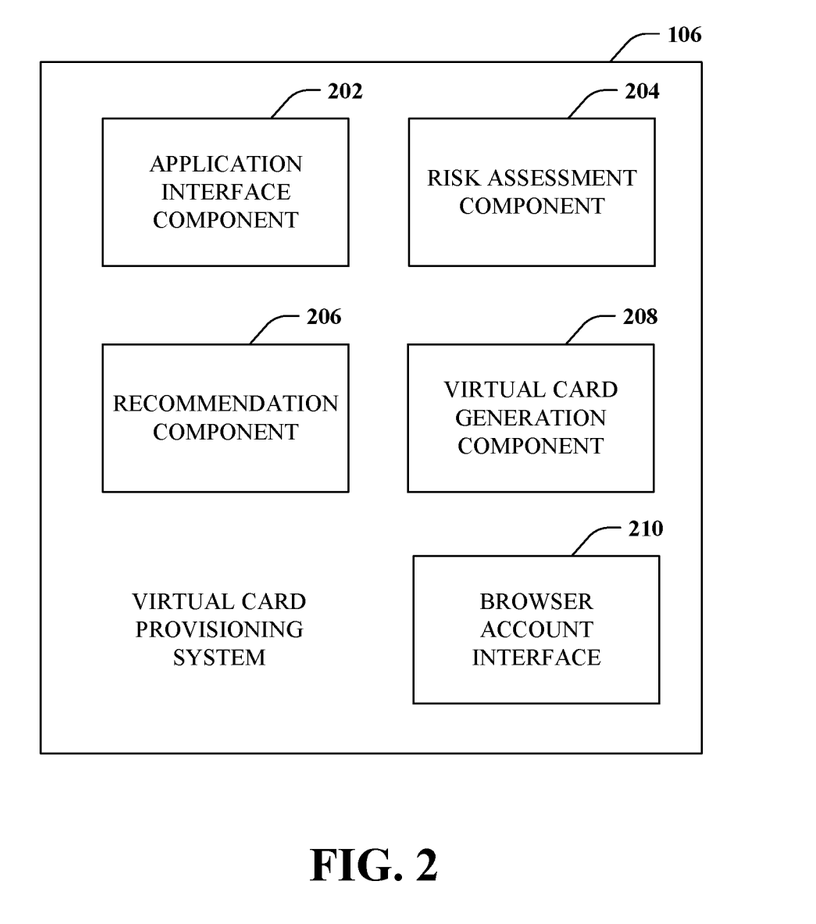
FIG. 2 is a block diagram of an example virtual card provisioning system.

FIG. 2 is a block diagram depicting an example virtual card provisioning system 106. The system 106 comprises application interface component 202, risk assessment component 204, recommendation component 206, virtual card generation component 208, and browser account interface component 210. The application interface component 202, risk assessment component 204, recommendation component 206, virtual card generation component 208, and browser account interface component 210 can be implemented by a processor coupled to a memory that stores instructions that cause the processor to perform the functionality of each component when executed. Consequently, a computing device can be configured to be a special-purpose device or appliance that implements the functionality of the virtual card provisioning system 106.

The application interface component 202 is operable to enable electronic interaction with a primary cardholder. The application interface component 202 can be a general-purpose graphical user interface associated with a mobile banking application or web service or a special-purpose interface associated with account management and, in particular, authorized users. The application interface component 202 can provide options for adding an authorized user to an account, including providing a virtual payment card to a browser. After this option is selected, information can be solicited regarding the individual to be added as an authorized user, such as name, address, and social security number. Information can also include an email address or other identifier linked with a browser profile or account associated with browser personalization (e.g., Google account, Microsoft account, Yahoo! account).

The risk assessment component 204 is operable to evaluate the risk associated with a designated individual being added as an authorized user. Information received from a primary cardholder regarding the individual, as well as any other information that is received, retrieved, or otherwise obtained or acquired from other sources, can be utilized to evaluate the risk. The risk can capture the likelihood that the individual is a bad actor who seeks to infiltrate or attack systems maliciously. For example, functionality associated with an authorized user can be attacked in a manner that causes a bad actor or coconspirator to be added as an authorized user. To combat this and other situations, the individual designated for addition as an authorized user can be scrutinized for features indicative of a bad actor. In one aspect, a risk score can be computed based on the information. The risk score can subsequently be compared to a predetermined threshold to determine whether to add the individual as an authorized user.

The risk assessment component 204 is also operable to evaluate the risk of adding a known, good actor. For example, the risk assessment component 204 can evaluate creditworthiness factors associated with an individual, such as the primary cardholder's friend or relative. The risk is then associated with the individual to the primary cardholder. The same or a different risk score (e.g., credit risk score) can be computed. The risk score can then be compared to one or more predetermined thresholds to aid a primary cardholder in reconsidering adding the individual or putting some purchase constraints in place to protect the primary cardholder.

The recommendation component 206 is operable to generate and provide recommendations or suggestions to a primary user. In one instance, the recommendation component can suggest one or more purchase constraints be employed based on a risk score satisfying a threshold for high risk. For example, the recommendation component 206 can identify constraints that would change the risk score into an acceptable range and suggest these constraints to the primary cardholder. Similarly, if the risk score satisfies a threshold associated with a likelihood that the individual is a bad actor, a recommendation can be made to the primary cardholder to cancel the process or at least confirm that the identified individual is to be designated as an authorized user.

The virtual card generation component 208 is operable to generate a virtual payment card for the authorized user. The virtual card generation component 208 can generate a virtual card number, expiration date, and security code. Further, the virtual card number can be linked to a primary account holder's account or card. Any specified purchase constraints can also be set for a virtual payment card after the virtual card is generated. For example, the virtual card can be constrained to a single use or confined to use at a particular merchant, for particular goods or services, and for a particular amount.

The browser account interface component 210 is operable to interact with a browser account or profile of an individual designated as an authorized user. In one embodiment, the browser account interface component 210 can employ an application programming interface (API) to interact with a browser account or profile, for example, to add a virtual payment card as a payment method to the browser account or profile for online purchases. Further, the browser account interface component 210 can interact with the account or profile to acquire information about an individual that can be employed to evaluate the risk associated with designating the individual as an authorized user. In another embodiment, the browser account interface component 210 can have a graphical aspect that seeks approval to add the virtual payment card as a payment method from the individual. A script is executed to automatically add the virtual payment card if approval is granted. The script can employ backend calls or simulate user actions to add the virtual payment card.

The aforementioned systems, architectures, platforms, environments, or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished following either a push and/or pull control model. The components may also interact with one or more other components not specifically described herein for the sake of brevity but known by those of skill in the art.

Various portions of the disclosed systems above and methods below can include or employ artificial intelligence, machine learning, or knowledge or rule-based components, sub-components, processes, means, methodologies, or mechanisms (e.g., support vector machines, neural networks, expert systems, Bayesian belief networks, fuzzy logic, data fusion engines, classifiers). Such components, among others, can automate certain mechanisms or processes performed, thereby making portions of the systems and methods more adaptive as well as efficient and intelligent. By way of example, and not limitation, the virtual card provisioning system 106 can employ such mechanisms at least to assess the risk associated with adding an individual as an authorized user. For example, a machine learning model can be trained and employed to automatically assess the risk of a bad actor based on a myriad of factors. Further, a machine learning model can be employed to make recommendations based on the risk, including aborting a process of adding an authorized user or suggesting purchase restrictions to mitigate risk.

In view of the example systems described above, methods that may be implemented in accordance with the disclosed subject matter will be better appreciated with reference to flow chart diagrams of FIGS. 3-6. While for purposes of simplicity of explanation, the methods are shown and described as a series of blocks, it is to be understood and appreciated that the disclosed subject matter is not limited by order of the blocks, as some blocks may occur in different orders and/or concurrently with other blocks from what is depicted and described herein. Moreover, not all illustrated blocks may be required to implement the methods described hereinafter. Further, each block or combination of blocks can be implemented by computer program instructions that can be provided to a processor to produce a machine, such that the instructions executing on the processor create a means for implementing functions specified by a flow chart block.

Figure 3:
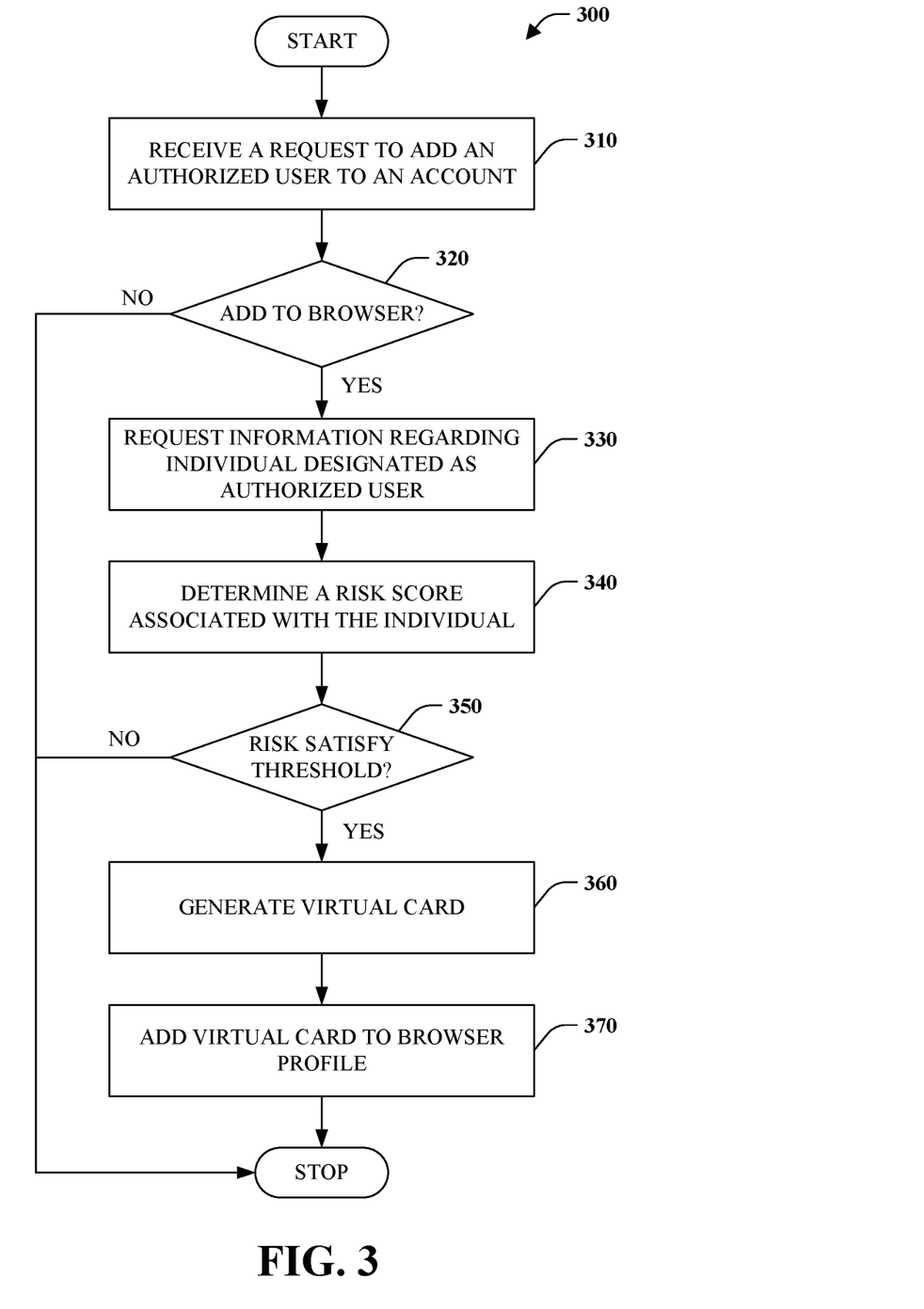
FIG. 3 is a flow chart diagram of a method of provisioning a virtual payment card to a browser for an authorized user.

Turning attention to FIG. 3, a method 300 of provisioning a virtual payment card to a browser for an authorized user is illustrated. The method 300 can be implemented and executed by the virtual card provisioning system 106.

At reference numeral 310, a request to add an authorized user to an account is received, retrieved, or otherwise obtained or acquired. The request can be sent from a primary account holder or cardholder, for example, through an online banking service or mobile banking application.

At numeral 320, a determination is made as to whether or not a payment mechanism is added to a browser. Many options exist to enable an individual to use funds of another, including issuing a physical payment card as is conventionally done. If the option included in the request is not the browser option ("NO"), the method 300 can terminate. If the option specified by the request is the browser option ("YES"), the method 300 can continue at 330.

At reference numeral 330, information is requested regarding an individual to be designated as an authorized user. The information can be requested from a primary account holder and cardholder. It can include name, address, and social security number, among other information concerning an individual sought to be designated as an authorized user. Additionally, an email address or other identifier associated with a browser account or profile can be requested. After receipt, further information can be requested and received from a browser profile associated with the individual, such as internet protocol address, used devices, location, and browser history, among other things. In one instance, an individual can utilize privacy control settings to permit or deny the use of certain information for consideration in adding the individual as an authorized user.

At numeral 340, a risk score is associated with the individual designated as an authorized user. An authorized user has access to a credit or debit account of another with no obligation to pay or reimburse the primary account holder for purchases. A risk score is computed based on received information to measure risk associated with an individual. For example, the risk score is designed to capture factors associated with a bad actor, such as a cybercriminal that seeks to intentionally add themselves or a coconspirator as an authorized user for financial gain. As such, the risk score can be a combination of numeric scores and weights associated with numerous factors. For example, if it can be determined that the associated individual is in a country different than the primary cardholder and the country historically is associated with fraud, this can be captured as a numeric value such as a negative one, as opposed to a neutral value of zero or a positive value of one. This value can be weighted and combined with values of other factors to produce the risk score. In one instance, a machine learning model can be developed and trained to produce the risk score, which could correspond to a confidence level that the individual is a good or bad actor.

At reference numeral 350, a determination is made as to whether the risk score satisfies a predetermined threshold. In one instance, the threshold is satisfied if the risk score is lower than the predetermined threshold, and the threshold is not satisfied if the risk score is greater than or equal to the predetermined threshold. If the risk score does not satisfy the predetermined threshold ("NO"), the method 300 terminates. If the risk score does satisfy the predetermined threshold, the method 300 can proceed at 360.

At reference numeral 360, a virtual payment card is generated. Generating a virtual payment card involves generating a unique card number and specifying an expiration date and security code. Further, generation includes linking the virtual payment card to an account of the primary cardholder. After generating the card, any purchasing constraints can also be specified for the virtual payment card. Of course, the constraints can be applied or changed later.

At numeral 370, the generated virtual payment card can be added to a browser profile of the authorized user. In one instance, an authorized user's email or other identifier associated with a browser account or profile can be used to access the profile and add the virtual payment card as a payment method in the profile, for example, using backend programming hooks or an interface.

Figure 4:
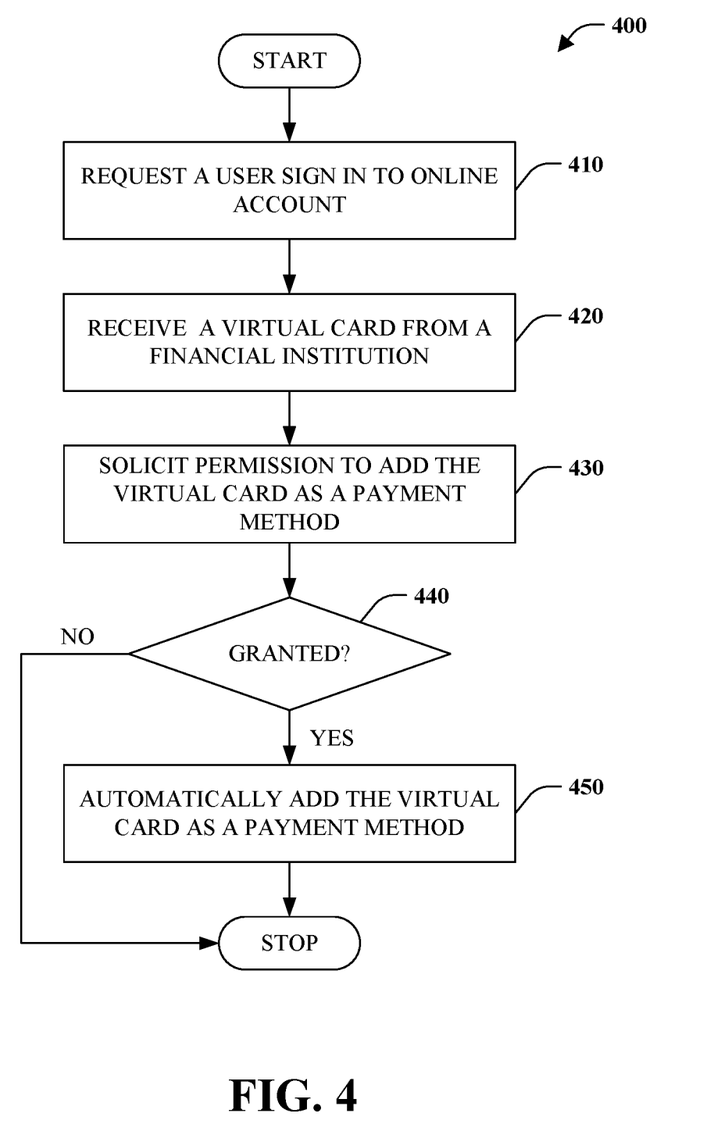
FIG. 4 is a flow chart diagram of a method of adding a virtual card as a browser-based payment method.

Turning attention to FIG. 4, a method 400 of adding a virtual payment card as a browser-based payment method is depicted. The method 400 can be implemented and executed by the virtual card provisioning system 106 and, more specifically, the browser account interface component 210.

At reference numeral 410, user sign-in to an online account is requested. For example, an email address associated with the user can be located, and the request sent to the user at the email address. Other communication mechanisms can also be used, including application notifications and text messages, among others. A user can enter a user name and password to access an online account associated with a browser in response to the request.

At numeral 420, a virtual card is received or retrieved from a financial institution. A virtual card is a non-physical payment mechanism comprising a unique number, expiration date, and security code. Further, the virtual card is linked to an account of a primary cardholder. The financial institution can generate the virtual card and provide the virtual card for addition as a browser-based payment method.

At reference numeral 430, permission is solicited to add the virtual card as a payment method. The user can grant or deny permission to add the virtual card. A determination is made at numeral 440 as to whether permission was granted or not. If permission was not granted but rather was denied ("NO"), the method 400 can simply terminate. However, if permission was granted ("YES"), the method 400 can continue to numeral 450.

At numeral 450, the virtual card can be added as a payment method automatically. In accordance with one aspect, a program, such as a script, can be triggered that automatically adds the virtual card as a browser-based payment method. In one instance, the script can simulate user actions with respect to a browser account or profile. Alternatively, the script can employ backend calls to add the virtual card, such as those provided by an application programming interface. Further, instructions can also be provided to the user to navigate to a location, and the virtual card can subsequently be pasted to the location to add the virtual card as a payment method.

Figure 5:
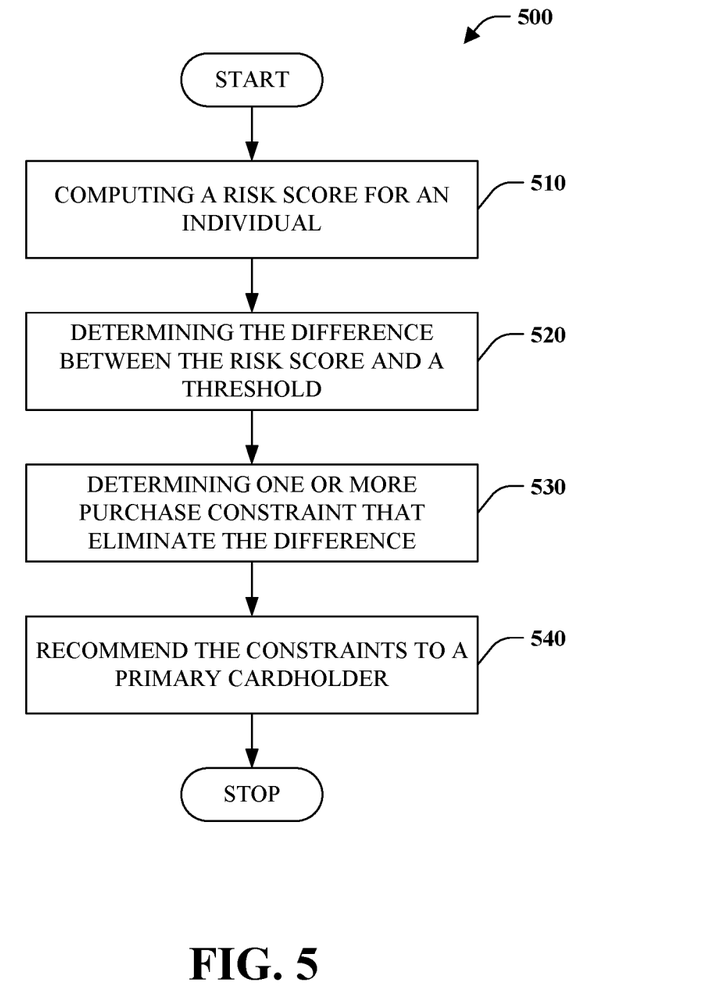
FIG. 5 is a flow chart diagram of a recommendation method.

FIG. 5 is a flow chart diagram of a recommendation method 500. The method 500 can be implemented and executed by the virtual card provisioning system 106 and, more specifically, the risk assessment component 204 and recommendation component 206.

At reference number 510, a risk score is computed for an individual. The risk score can be based on information provided by the primary cardholder about the individual, such as name, address, phone number, email address, and social security number. Further processing can be performed to assign values to factors and weights to the factors that comprise a composite risk score based on the information. In one instance, deny and allow lists can be consulted to assign a positive or negative value based on presence on an allow or deny list. For example, suppose the individual's location or email is present on a deny list associated with fraud. In that case, this can increase the risk, and the risk score can be adjusted accordingly. Additional information received or retrieved from a browser profile or account can also be utilized to modify the risk score. In one instance, a browser vendor can compute a risk score internally and expose the risk score. This score can be incorporated into a composite risk score including a score associated with information provided by a primary cardholder and information from a browser vendor.

At reference numeral 520, a determination is made as to the difference between the risk score and a threshold value. The risk score represents the current amount of risk, and the threshold value can correspond to an acceptable amount of risk. The difference can be computed between the current and acceptable amounts of risk.

At numeral 530, one or more purchase constraints can be determined, given the risk difference. The one or more purchase constraints can be sought to mitigate or eliminate the risk difference. Purchase constraints or restrictions can be one-time use, product or service-specific, merchant-specific, maximum transaction amount, and maximum overall purchase amount, among other things. Each constraint can have a quantitative impact on the risk score. The determination can involve identifying a set of constraints to eliminate the risk difference. For example, a one-time use and maximum transaction amount constraint could be determined to overcome the risk difference. The determination can seek to identify a constraint or combination of constraints finely tailored to address the risk difference instead of simply applying all constraints.

At reference numeral 530, the identified constraints can be recommended to a primary cardholder. For example, the recommendation can be returned through the same mechanism the primary cardholder used to request the addition of an individual as an authorized user, for instance, as an application alert in an online banking application. The primary cardholder can accept or reject the recommendation. Alternatively, the primary cardholder can add or remove constraints as desired.

Figure 6:
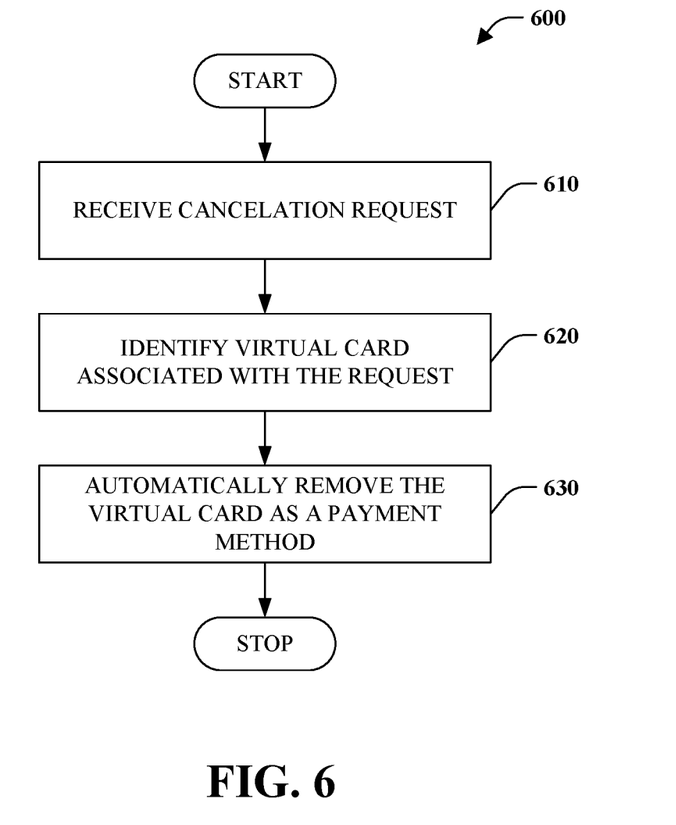
FIG. 6 is a flow chart diagram of a method of removing a virtual payment card.

FIG. 6 is a flow chart diagram of a method 600 of removing a virtual payment card. The method 600 can be implemented and executed by the virtual card provisioning system 106.

At reference numeral 610, a cancelation request can be received. The cancelation request can be received from a primary cardholder to cancel the virtual payment card. A cancelation request can also be generated automatically based on virtual payment card constraints. For example, a cancelation request can be generated after a one-time use constraint is satisfied, or the card expires. Further, report or detection of fraud can result in a cancelation request.

At numeral 620, the virtual card associated with the request can be identified. In one instance, the virtual card can be provided with and identified from the request. In another instance, the request can include a user identifier, such as an email address that can be utilized to look up and identify the virtual card. Still further yet, the virtual card can be identified as part of a browser profile accessed utilizing at least a user identifier.

At reference numeral 630, the virtual card is automatically removed as a payment method from a browser account or profile. In one embodiment, a program such as a browser script can be initiated to navigate a browser to the virtual card and initiate removal of the virtual card as a payment method. Of course, the script can also employ an application programming interface if exposed to remove the virtual card instead of simulating user actions.

This disclosure pertains to the technical problem of web browsers and online purchases by an authorized user of an electronic account. The technical solution comprises generation of a virtual payment card for an authorized user linked to a primary cardholder's account. The virtual payment card can be provisioned to a web browser and saved to a web browser account or profile of an individual designated as the authorized user as a payment method. Subsequently, the authorized user can employ the virtual payment card through the browser to provide payment for online goods or services. Further, prior to provisioning a virtual card to the web browser, analysis can be performed with respect to an individual designated to be an authorized user. The analysis can be based on data provided by a primary cardholder and data from a web browser. A risk score can be computed based on the data representing the likelihood that the individual is a bad actor or poses a risk to the account and primary cardholder. Control of further processing regarding a request to add an authorized user can be governed based on the risk score and comparison to a predetermined threshold.

As used herein, the terms "component" and "system," as well as various forms thereof (e.g., components, systems, sub-systems . . . ) are intended to refer to a computer-related entity, either hardware, a combination of hardware and software, software, or software in execution. For example, a component may be but is not limited to being a process running on a processor, a processor, an object, an instance, an executable, a thread of execution, a program, and/or a computer. By way of illustration, both an application running on a computer and the computer can be a component. One or more components may reside within a process and/or thread of execution, and a component may be localized on one computer and/or distributed between two or more computers.

As used herein, the term "infer" or "inference" generally refer to the process of reasoning about or inferring states of a system, a component, an environment, or a user from one or more observations captured by way of events or data, among other things. Inference may be employed to identify a context or an action or may be used to generate a probability distribution over states, for example. An inference may be probabilistic. For example, computation of a probability distribution over states of interest can be based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several events and data sources.

The conjunction "or" as used in this description and appended claims is intended to mean an inclusive "or" rather than an exclusive "or," unless otherwise specified or clear from the context. In other words, "'X' or 'Y'" is intended to mean any inclusive permutations of "X" and "Y." For example, if "'A' employs 'X,'" "'A employs 'Y,'" or "'A' employs both 'X' and 'Y,'" then "'A' employs 'X' or 'Y'" is satisfied under any of the preceding instances.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

Figure 7:
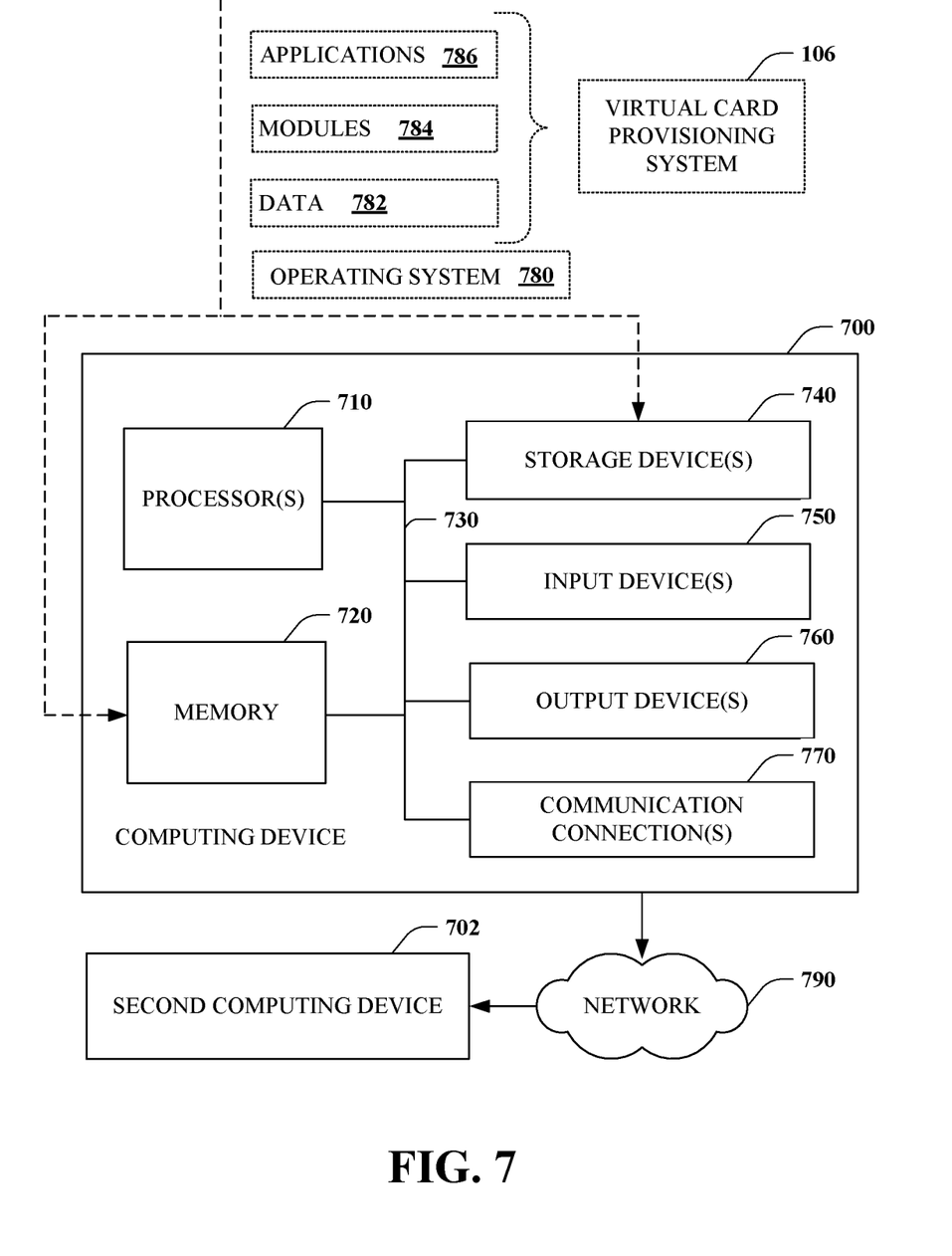
FIG. 7 is a block diagram illustrating a suitable operating environment for aspects of the subject disclosure.

To provide a context for the disclosed subject matter, FIG. 7, as well as the following discussion, are intended to provide a brief, general description of a suitable environment in which various aspects of the disclosed subject matter can be implemented. However, the suitable environment is solely an example and is not intended to suggest any limitation on scope of use or functionality.

While the above-disclosed system and methods can be described in the general context of computer-executable instructions of a program that runs on one or more computers, those skilled in the art will recognize that aspects can also be implemented in combination with other program modules or the like. Generally, program modules include routines, programs, components, data structures, among other things, which perform particular tasks and/or implement particular abstract data types. Moreover, those skilled in the art will appreciate that the above systems and methods can be practiced with various computer system configurations, including single-processor, multi-processor or multi-core processor computer systems, mini-computing devices, server computers, as well as personal computers, hand-held computing devices (e.g., personal digital assistant (PDA), smartphone, tablet, watch . . . ), microprocessor-based or programmable consumer or industrial electronics, and the like. Aspects can also be practiced in distributed computing environments where tasks are performed by remote processing devices linked through a communications network. However, some, if not all aspects, of the disclosed subject matter can be practiced on standalone computers. In a distributed computing environment, program modules may be located in one or both of local and remote memory devices.

FIG. 7 illustrates an example computing device 700 (e.g., desktop, laptop, tablet, watch, server, hand-held, programmable consumer or industrial electronics, set-top box, game system, compute node). The computing device 700 includes one or more processor(s) 710, memory 720, system bus 730, storage device(s) 740, input device(s) 750, output device(s) 760, and communications connection(s) 770. The system bus 730 communicatively couples at least the above system constituents. However, the computing device 700, in its simplest form, can include one or more processors 710 coupled to memory 720, wherein the one or more processors 710 execute various computer-executable actions, instructions, and or components stored in the memory 720.

The processor(s) 710 can be implemented with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 710 may also be implemented as a combination of computing devices, for example, a combination of a DSP and a microprocessor, a plurality of microprocessors, multi-core processors, one or more microprocessors in conjunction with a DSP core, or any other such configuration. In one embodiment, the processor(s) 710 can be a graphics processor unit (GPU) that performs calculations concerning digital image processing and computer graphics.

The computing device 700 can include or otherwise interact with a variety of computer-readable media to facilitate control of the computing device to implement one or more aspects of the disclosed subject matter. The computer-readable media can be any available media accessible to the computing device 700 and includes volatile and non-volatile media, and removable and non-removable media. Computer-readable media can comprise two distinct and mutually exclusive types: storage media and communication media.

Storage media includes volatile and non-volatile, removable and non-removable media implemented in any method or technology for storage of information such as computer-readable instructions, data structures, program modules, or other data. Storage media includes storage devices such as memory devices (e.g., random access memory (RAM), read-only memory (ROM), electrically erasable programmable read-only memory (EEPROM) . . . ), magnetic storage devices (e.g., hard disk, floppy disk, cassettes, tape . . . ), optical disks (e.g., compact disk (CD), digital versatile disk (DVD) . . . ), and solid-state devices (e.g., solid-state drive (SSD), flash memory drive (e.g., card, stick, key drive . . . ) . . . ), or any other like mediums that store, as opposed to transmit or communicate, the desired information accessible by the computing device 700. Accordingly, storage media excludes modulated data signals as well as that which is described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

The memory 720 and storage device(s) 740 are examples of computer-readable storage media. Depending on the configuration and type of computing device, the memory 720 may be volatile (e.g., random access memory (RAM)), non-volatile (e.g., read only memory (ROM), flash memory . . . ), or some combination of the two. By way of example, the basic input/output system (BIOS), including basic routines to transfer information between elements within the computing device 700, such as during start-up, can be stored in non-volatile memory, while volatile memory can act as external cache memory to facilitate processing by the processor(s) 710, among other things.

The storage device(s) 740 include removable/non-removable, volatile/non-volatile storage media for storage of vast amounts of data relative to the memory 720. For example, storage device(s) 740 include, but are not limited to, one or more devices such as a magnetic or optical disk drive, floppy disk drive, flash memory, solid-state drive, or memory stick.

Memory 720 and storage device(s) 740 can include, or have stored therein, operating system 780, one or more applications 786, one or more program modules 784, and data 782. The operating system 780 acts to control and allocate resources of the computing device 700. Applications 786 include one or both of system and application software and can exploit management of resources by the operating system 780 through program modules 784 and data 782 stored in the memory 720 and/or storage device(s) 740 to perform one or more actions. Accordingly, applications 786 can turn a general-purpose computer 700 into a specialized machine in accordance with the logic provided thereby.

All or portions of the disclosed subject matter can be implemented using standard programming and/or engineering techniques to produce software, firmware, hardware, or any combination thereof to control the computing device 700 to realize the disclosed functionality. By way of example and not limitation, all or portions of the view extension system 200 can be, or form part of, the application 786, and include one or more modules 784 and data 782 stored in memory and/or storage device(s) 740 whose functionality can be realized when executed by one or more processor(s) 710.

In accordance with one particular embodiment, the processor(s) 710 can correspond to a system on a chip (SOC) or like architecture including, or in other words integrating, both hardware and software on a single integrated circuit substrate. Here, the processor(s) 710 can include one or more processors as well as memory at least similar to the processor(s) 710 and memory 720, among other things. Conventional processors include a minimal amount of hardware and software and rely extensively on external hardware and software. By contrast, a SOC implementation of a processor is more powerful, as it embeds hardware and software therein that enable particular functionality with minimal or no reliance on external hardware and software. For example, the view extension system 200 and/or functionality associated therewith can be embedded within hardware in a SOC architecture.

The input device(s) 750 and output device(s) 760 can be communicatively coupled to the computing device 700. By way of example, the input device(s) 750 can include a pointing device (e.g., mouse, trackball, stylus, pen, touchpad), keyboard, joystick, microphone, voice user interface system, camera, motion sensor, and a global positioning satellite (GPS) receiver and transmitter, among other things. The output device(s) 760, by way of example, can correspond to a display device (e.g., liquid crystal display (LCD), light emitting diode (LED), plasma, organic light-emitting diode display (OLED) . . . ), speakers, voice user interface system, printer, and vibration motor, among other things. The input device(s) 750 and output device(s) 760 can be connected to the computing device 700 by way of wired connection (e.g., bus), wireless connection (e.g., Wi-Fi, Bluetooth), or a combination thereof.

The computing device 700 can also include communication connection(s) 770 to enable communication with at least a second computing device 702 utilizing a network 790. The communication connection(s) 770 can include wired or wireless communication mechanisms to support network communication. The network 790 can correspond to a personal area network (PAN), local area network (LAN), or a wide area network (WAN) such as the internet. In one instance, the computing device 700 can correspond to a user desktop, laptop, or tablet computer operated by a primary cardholder of an account. The second computing device 702 can be a financial institution server that receives and processes a request to add an individual as an authorized user by a virtual payment card provisioned through a web browser. In another instance, the computing device 700 can correspond to a financial institution server, and the second computing device 702 can correspond to a web browser account server that manages user profiles. In this scenario, the computing device 700 can execute the virtual card provisioning system 106 to generate and provide a virtual payment card to the second computing device 702 over the network 790. In yet another instance, the computing device 700 can correspond to a web browser account server that manages user accounts, profiles, and payment methods associated with a user, and the second computing device 702 can correspond to a user computing device that includes a browser that can be personalized by downloading a web browser profile.

What has been described above includes examples of aspects of the claimed subject matter. It is, of course, not possible to describe every conceivable combination of components or methods to describe the claimed subject matter. However, one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims.

What is claimed is:

1. A virtual payment card provisioning system, comprising:
a processor coupled to a memory that includes instructions that, when executed by the processor, cause the processor to:
request information about an individual, including a browser profile identifier, in response to a request from a primary cardholder to add the individual as an authorized user;
compute a risk score associated with adding the individual as an authorized user based on the information;
control further processing based on a result of a comparison between the risk score and a predetermined threshold;
generate a virtual payment card linked to an account of a primary cardholder that enables an online purchase with the virtual payment card; and
initiate addition of the virtual payment card as a payment method to a browser profile of the individual on a network-accessible computing resource based on the browser profile identifier.

2. The system of claim 1, wherein the instructions further cause the processor to:
notify the primary cardholder of the risk score when the risk score satisfies the predetermined threshold;
request permission to proceed from the primary cardholder; and
initiate the further processing in generation of the virtual payment card and addition of the virtual payment card as the payment method to the browser profile when the permission is granted.

3. The system of claim 1, wherein the instructions further cause the processor to terminate processing and transmit a message to the primary cardholder that indicates the request is rejected based on the result of the comparison.

4. The system of claim 1, wherein the instructions further cause the processor to compute the risk score based on information associated with the browser profile.

5. The system of claim 4, wherein the information associated with the browser profile includes at least one of browser version, internet protocol address, devices used, or browser history.

6. The system of claim 1, wherein the instructions further cause the processor to generate and transmit a recommendation to apply one or more purchase restrictions on the virtual payment card based on the risk score.

7. The system of claim 1, wherein the instructions further cause the processor to initiate removal of the virtual payment card as the payment method.

8. The system of claim 7, wherein the instructions further cause the processor to initiate the removal in response to cancelation of the virtual payment card by the primary cardholder.

9. The system of claim 1, wherein initiate the addition of the virtual payment card further causes the processor to:

request the individual log in to a network-accessible resource to access the browser profile;

solicit permission to add the virtual payment card; and trigger execution of a program that automatically adds the virtual payment card as a payment method to the browser profile in response to granted permission.

10. The system of claim 1, wherein the browser profile is utilized by a client-side browser for personalization after the individual logs in through the browser.

11. A method, comprising:

executing, on a processor, instructions that cause the processor to perform operations that provision a virtual payment card to a web browser, the operations comprising:

requesting information about an individual from a primary cardholder in response to a request to add an individual as an authorized user to an account of the primary cardholder;

computing a risk score based on provided information;

determining that the risk score satisfies a predetermined threshold for further processing;

generating a virtual payment card linked to an account of the primary cardholder, wherein the virtual payment card is an electronic payment mechanism for online shopping purchases; and initiating addition of the virtual payment card as a payment method to a browser profile of the individual, wherein the browser profile is stored on a network-accessible computing resource and employed to personalize a web browser.

12. The method of claim 11, the operations further comprising:

requesting the individual log in to access the browser profile of the individual;

soliciting permission to add the virtual payment card; and executing a program in response to granted permission that automatically adds the virtual payment card as the payment method for the browser profile.

13. The method of claim 11, the operations further comprising computing the risk score based on browsing information associated with the browser profile.

14. The method of claim 11, the operations further comprising terminating processing prior to generating the virtual payment card and initiating addition of the virtual payment card as the payment method in response to the risk score failing to satisfy the predetermined threshold.

15. The method of claim 11, the operations further comprising:

determining one or more purchase restrictions on the virtual payment card that reduce the risk score in response to failure of the risk score to satisfy the predetermined threshold; and recommending specification of the purchase restrictions to the primary cardholder.

16. The method of claim 11, the operations further comprising initiating removal of the virtual payment card in response to cancelation of the virtual payment card by the primary cardholder.

17. The method of claim 11, the operations further comprising notifying the individual of a virtual payment card restriction that causes a purchase transaction to be declined.

* * * * *